UNITED STATES PATENT OFFICE.

JOHN A. ROBINSON AND ROBERT H. DIMOCK, OF NEW HAVEN, CONN.

DEFLAGRATING COMPOUND.

SPECIFICATION forming part of Letters Patent No. 228,935, dated June 15, 1880.

Application filed May 5, 1879.

*To all whom it may concern:*

Be it known that we, JOHN A. ROBINSON and ROBERT H. DIMOCK, both of the town and county of New Haven, and State of Connecticut, have invented a new and Improved Method of Rendering Amorphous Phosphorus Available for use in the Manufacture of Explosive and Deflagrating Compounds, which method is fully described in the following specification.

This invention relates to a method of rendering amorphous phosphorus available for use in the manufacture of explosive and deflagrating compounds—first, by combining with it such chemical agents as will free it from all the crude phosphorus and oxides of phosphorus which still remain in it, either by causing such crude phosphorus or oxides of phosphorus to escape altogether from the compound, or by causing them to form insoluble salts with certain elements in said chemical agents; second, by combining with the amorphous phosphorus such chemical agents as will furnish to the amorphous phosphorus, when raised to a proper temperature, an amount of oxygen sufficient to enable it to deflagrate even *in vacuo;* and, third, by combining with the amorphous phosphorus such other chemical agents as will, under the influence of proper friction or percussion, cause the deflagration of the amorphous phosphorus.

Be it known that we do not claim that our invention covers every combination of amorphous phosphorus with the chemical agents hereinafter described, irrespective of the manner in which such combinations are made and of the chemical effects thereby produced; but we do claim to have discovered that amorphous phosphorus can be successfully used in the manufacture of explosive and deflagrating compounds, provided, first, that all crude phosphorus and oxides of phosphorus are removed from it in such a manner that they either escape altogether from the final compound, or, if they remain in it at all, remain in it as forming insoluble salts with other elements, and are thus impervious to damp and to atmospheric changes; second, that such elements are added to the amorphous phosphorus that, even though excluded from the external air, it shall be supplied with sufficient oxygen to enable it to deflagrate when properly heated; and, third, that such further elements are added as, when rubbed or struck, shall cause such deflagration.

The principles involved in this discovery we have reduced to practice, and by the method hereinafter described we have perfectly accomplished these several results.

It is obvious that if the chemical agents employed to remove the crude phosphorus and its oxides form therewith a deliquescent salt, which still remains in the compound, such deliquescent character must be removed before the compound can be made impervious to atmospheric changes. This is an operation involving considerable difficulty, and has not yet given us satisfactory results. The method which we have found perfectly successful, and which is hereinafter described, is far more direct and economical, and accomplishes the first two of the three chemical effects above described by the use of a single substance and in a single operation.

The chemical agents which we use to remove the crude phosphorus and its oxides and to furnish the oxygen are the metallic oxides, especially those which are in combination with a weak acid. The one which gives uniformly perfect results is plumbic plumbate.

The chemical agents which we use to cause deflagration belong to that class of substances of which chlorate of potassium is a type, and of these the chlorate of potassium gives perfect results.

The method which we employ to produce the desired result by means of these chemical agents is the following: Take of amorphous phosphorus, plumbic plumbate, chlorate of potassium, and hot water, (the best temperature for which is about 200° Fahrenheit.) To a sufficient quantity of the hot water to render the whole mixture of a fluid consistency add the amorphous phosphorus and mix thoroughly; then add the plumbate in small quantities at a time, stirring constantly till effervescence ceases; then add the chlorate of potassium in about the same quantity as the amorphous phosphorus and mix thoroughly. The necessary proportions of the ingredients depend in part upon their purity and in part upon the desired sensitiveness of the compound. The plumbate should be added till effervescence ceases.

If the plumbic plumbate is not added as long as effervescence can thereby be produced, some crude phosphorus or oxide of phosphorus is likely to remain uncombined in the mixture and render the final compound liable to spontaneous combustion and to be affected by dampness. If more plumbate is added than is necessary to keep up the effervescence, the excess of plumbate will remain in the final compound, and after deflagration will leave a residuum which will cause fouling.

An increase in the proportion of chlorate of potassium renders the compound more sensitive, and vice versa.

The formula which has given us the best results with the ingredients as ordinarily found in commerce is the following: Amorphous phosphorus, by weight, two parts; plumbic plumbate, by weight, eight parts; chlorate of potassium, by weight, two parts; hot water, by weight, nine and six-eighths part.

If the chlorate of potassium is added to the amorphous phosphorus before the plumbic plumbate is added, the union of the amorphous phosphorus with the plumbate is less readily and thoroughly effected and the effervescence is less brisk and discernible. If the water is not hot enough, the chemical union between the amorphous phosphorus and the plumbic plumbate either does not take place at all or takes place imperfectly, while if the water is boiling the effervescence cannot be accurately watched as it should be.

The product resulting from this method of treating amorphous phosphorus is a new fulminating or deflagrating compound, which may be used in the following manner:

For rim-fire cartridges, add to such a quantity of the fulminating compound as is produced by using two ounces of amorphous phosphorus, eight ounces of plumbic plumbate and two ounces of chlorate of potassium; of powdered gum-tragacanth, thirty grains; of powdered gum-arabic, twenty grains, and stir for fifteen or twenty minutes; then add four ounces of powdered glass, No. 0, and mix thoroughly. Keep the whole moist with water during the priming process, and wash the priming-plates immediately after priming, as with fulminate of mercury.

For center-fire cartridges, caps, &c., add to the same quantity of the fulminating compound as described for rim-fire cartridges four ounces powdered glass, No. 0, mix thoroughly, spread the whole in a thin layer on a stone slab, and let it dry. Then pour on it nine and six-eighths ounces of varnish, (made by dissolving one pound of shellac in one gallon of alcohol of ninety-five per cent.,) mix thoroughly, and dry by very gentle manipulation with a wooden spatula or other proper instrument. Then use in the same manner as other dry fulminates are now used for the same purpose.

The fulminating compound as prepared for rim-fire cartridges may be kept for any length of time under water sufficient to cover it. As prepared for center-fire cartridges and caps, &c., it can be kept in a dry powder in bottles securely corked.

When we use the words or numerals "first," ("1,") "second," ("2,") "third," ("3,") we do not imply that the operations and results so enumerated must necessarily occur in that chronological order, although in the method above described they do so occur. We use these numerals and words merely to distinguish these operations and results from each other.

Having thus described our invention, we claim as new and desire to protect by Letters Patent—

1. The method of rendering amorphous phosphorus available for use in the manufacture of explosive and deflagrating compounds which consists in thoroughly mixing the amorphous phosphorus with a sufficient quantity of hot water to render the whole mixture of a fluid consistency, then adding plumbic plumbate in small quantities at a time and stirring constantly till effervescence ceases, and then adding chlorate of potassium in a quantity substantially equal to that of the amorphous phosphorus, and thoroughly mixing in the same, all as hereinbefore described.

2. The explosive or deflagrating compound produced by combining amorphous phosphorus with plumbic plumbate and chlorate of potassium in the proportions herein described.

JOHN A. ROBINSON.
R. H. DIMOCK.

In presence of—
JAMES H. WEBB,
CHARLES L. SWAN, Jr.